(12) United States Patent
Shirato et al.

(10) Patent No.: US 8,780,502 B2
(45) Date of Patent: Jul. 15, 2014

(54) VOICE COIL MOTOR WITH MAGNET HAVING PROTRUSION

(75) Inventors: Daisuke Shirato, DongGuan (CN); Da qing Huang, DongGuan (CN); Huan yin Zhong, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/179,816

(22) Filed: Jul. 11, 2011

(65) Prior Publication Data

US 2012/0300345 A1 Nov. 29, 2012

(30) Foreign Application Priority Data

May 27, 2011 (CN) .......................... 2011 1 0140252

(51) Int. Cl.
 *G11B 5/55* (2006.01)
(52) U.S. Cl.
 USPC ..................................................... 360/264.9
(58) Field of Classification Search
 USPC ............ 360/264.7–265, 266.4–266.9, 256.2; 310/154.21–154.25, 12.16; 720/666
 See application file for complete search history.

(56) References Cited

U.S. PATENT DOCUMENTS

| | | | | |
|---|---|---|---|---|
| 5,134,608 | A | * | 7/1992 | Strickler et al. ............... 720/662 |
| 5,329,267 | A | * | 7/1994 | Endoh et al. ................... 335/222 |
| 5,566,375 | A | * | 10/1996 | Isomura ..................... 360/256.2 |
| 5,986,362 | A | * | 11/1999 | Sukagawa et al. .......... 310/12.16 |
| 2002/0060886 | A1 | * | 5/2002 | Bae et al. .................... 360/264.7 |
| 2005/0174698 | A1 | * | 8/2005 | Matsuda et al. ............ 360/264.7 |
| 2007/0297095 | A1 | * | 12/2007 | Fujimoto et al. ........... 360/256.2 |
| 2008/0137234 | A1 | * | 6/2008 | Lee ............................ 360/245.9 |
| 2009/0122447 | A1 | * | 5/2009 | Kuwajima .................... 360/135 |
| 2012/0162826 | A1 | * | 6/2012 | Sudo et al. ................. 360/266.5 |

* cited by examiner

*Primary Examiner* — Wayne Young
*Assistant Examiner* — Adam B Dravininkas
(74) *Attorney, Agent, or Firm* — Nixon & Vanderhye PC (57) ABSTRACT

A voice coil motor for a disk drive unit includes an external magnet and an actuator coil movably located above the external magnet. The external magnet has a main body with a magnetic north pole, a magnetic south pole and a transition surface therebetween, and further has a protrusion extending from the center part of the main body for increasing torque force, thereby improving the performance of the voice coil motor. The invention also discloses a disk drive unit including the same.

20 Claims, 7 Drawing Sheets

VOICE COIL MOTOR WITH MAGNET HAVING PROTRUSION

This application claims the benefit of Chinese Patent Application No. 201110140252.0, filed on May 27, 2011, the entire content of which is hereby incorporated by reference in this application.

FIELD OF THE INVENTION

The present invention relates to magnetic hard disk drive devices and, more particularly, to a voice coil motor (VCM) with new magnet design, and disk drive unit with the same.

BACKGROUND OF THE INVENTION

One known type of information storage device is a disk drive device that uses magnetic media to store data and a movable read/write head that is positioned over the magnetic media to selectively read from or write to the magnetic media.

A conventional hard disk drive (HDD) generally includes a magnetic hard disk, a spindle motor for rotating the disk at a high speed, a head stacking assembly (HSA) with a slider configured to read data from and write data to a magnetic hard disk, a voice coil motor (VCM) provided for controlling the motion of the head stacking assembly (HSA), all of which are mounted into a housing.

Nowadays, two types of voice coil motor are manufactured and sold in the market. One popular type of voice coil motor (VCM) incorporated in a conventional hard disk drive includes an actuator coil and two magnets which are separately located on the bottom and top of the actuator coil, such a voice coil motor is called "dual magnets design". This type of voice coil motor has dual magnets to form a close magnetic filed, thereby having less magnetic flux loss and achieving bigger magnetic flux density. Normally, the bigger magnetic flux density will generate the bigger torque force and a better linearity of torque force is of benefit to improve the reading and writing performance of HDD.

Figure 1:
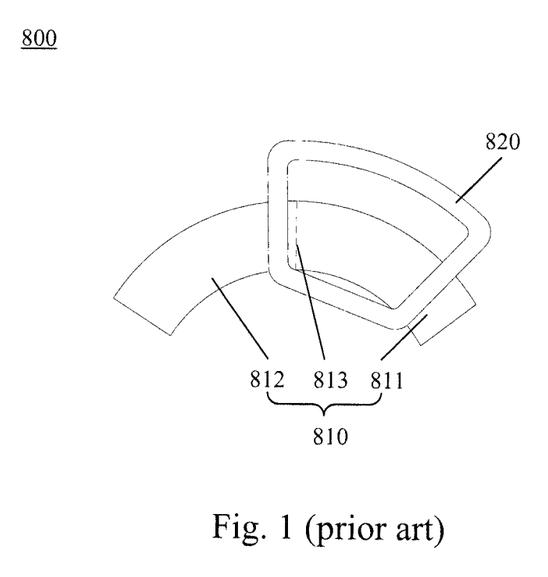
FIG. 1 is a top plan view of a conventional voice coil motor.

As shown in FIG. 1, another type of voice coil motor 800 includes only one magnet 810 which is located on the bottom or top of the actuator coil 820, it is called "single magnet design". Due to single magnet structure, the VCM 800 with single magnet design can reduce the manufacture and assembly cost of the VCM. Furthermore, the single magnet design has less surface area, so it can save the raw material including nickel which is plated on the surface of magnet 810, thereby reducing material cost and environment pollution. However, the magnet 810 has a neutral zone 813 which is the transition surface of magnetic north polar 811 and magnetic south polar 812, the magnetic flux density of neutral zone 813 is lower than other area of the magnet 810, whereas the existing single magnet 810 can not form a close magnetic filed to reduce magnetic flux loss, thus, the single magnet 810 has smaller magnetic flux density than dual magnets on the neutral zone area. So the torque force produced by the conventional single magnet 810 is lower than that produced by dual magnets on the close neutral zone area. Therefore, in order to make full use of the neutral zone area in the single magnet 810, we need to increase the torque force in the neutral zone area to improve the linearity of torque force from inner diameter (ID) to outer diameter (OD) of HDD.

Accordingly, it is desired to provide a voice coil motor with new magnet design to improve the linearity of torque force and then overcome the above-mentioned drawbacks.

SUMMARY OF THE INVENTION

One objective of the present invention is to provide a voice coil motor with new magnet design to provide a better linearity of torque force, thereby improving the performance of the voice coil motor.

Another objective of the present invention is to provide hard disk drive including a voice coil motor with new magnet design to provide a better linearity of torque force, thereby improving the reading and writing performance of the hard disk drive.

To achieve above objectives, the present invention provides a voice coil motor for a disk drive unit, the voice coil motor including an external magnet and an actuator coil movably located above the external magnet. The external magnet has a main body with a magnetic north pole, a magnetic south pole and a transition surface therebetween, and further has a protrusion extending from the center part of the main body for increasing torque force, thereby improving the performance of the voice coil motor.

As an embodiment of the present invention, the protrusion extends along with a position which is parallel to the actuator coil.

Preferably, the protrusion has a first edge located at the magnetic north pole of the external magnet, a second edge located at the magnetic south pole of the external magnet and a top edge connected with the first and second edges.

Preferably, both of the first and second edges are parallel to the transition surface and the top edge is perpendicular to the transition surface.

Preferably, the actuator coil has a top arm, a bottom arm, a first side arms and a second side arm, both of the first and second side arms connecting with the top and bottom arms.

Preferably, a distance between the first edge of the protrusion and the first side arm of the actuator coil is less than 1.3 mm, when the actuator coil moves to a position where the first side arm is most close to the transition surface.

Preferably, a distance between the second edge of the protrusion and the second side arm of the actuator coil is less than 1.3 mm, when the actuator coil moves to a position where the second side arm is most close to the transition surface.

Preferably, a distance between the top edge of the protrusion and the top arm of the actuator coil is less than 0.5 mm, when the actuator coil moves to a position where the center of the actuator coil matches with the center of the external magnet.

Preferably, the external magnet has a symmetrical structure.

Preferably, the actuator coil is fan-shaped.

Preferably, the main body of the external magnet is arch-shaped.

To achieve above objectives, the present invention further provides a disk drive unit which includes a head gimbal assembly including a slider mounted thereon, a drive arm connected to the head gimbal assembly, a disk, a spindle motor operable to spin the disk and a voice coil motor connected to the drive arm. The voice coil motor includes an external magnet and an actuator coil movably located above the external magnet. The external magnet has a main body with a magnetic north pole, a magnetic south pole and a transition surface therebetween, and further has a protrusion extending from the center part of the main body for increasing torque force, thereby improving the performance of the disk drive unit.

In comparison with the prior art, the voice coil motor of the present invention includes a single external magnet with a protrusion formed on the center part thereof. Such a protrusion can increase the torque force in the neutral zone (the transition surface) of the external magnet for providing a better linearity of torque force, thereby improving the performance of the voice coil motor. Furthermore, due to single magnet structure, the voice coil motor with single magnet design can simplify the manufacture and assembly process, thereby reducing the manufacture and assembly cost.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to a voice coil motor for a disk drive unit, which includes an external magnet and an actuator coil movably located above the external magnet. The external magnet has a main body with a magnetic north pole, a magnetic south pole and a transition surface therebetween, and further has a protrusion extending from the center part of the main body for increasing torque force, thereby improving the performance of the voice coil motor.

Figure 2:
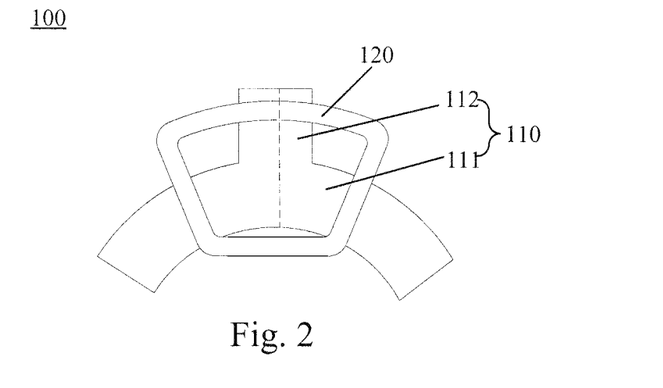
FIG. 2 is a top plan view of a voice coil motor according to an embodiment of the present invention.

FIG. 2 shows a detail structure of a voice coil motor used for a disk drive unit, according to an embodiment of the present invention. Now referring to FIG. 2, the voice coil motor 100 of the present invention includes an external magnet 110 and an actuator coil 120 movably located above the external magnet 110. Concretely, when the voice coil motor 100 is mounted onto the disk drive unit, the external magnet 110 is disposed into a base plate of the disk drive unit and the actuator coil 120 is connected to a tail end of a drive arm.

Figure 3A:
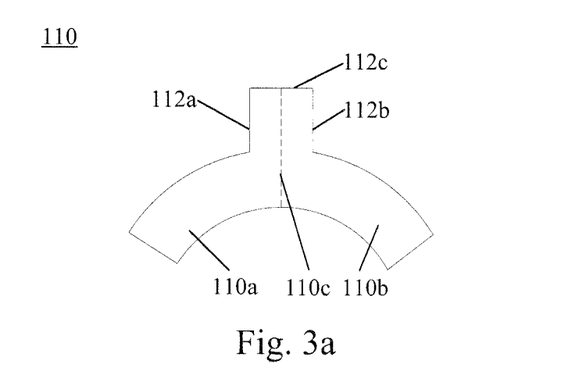
FIG. 3a is a top plan view of an external magnet of the voice coil motor shown in FIG. 2.

Referring to FIG. 2 and FIG. 3a, the external magnet 110 has a main body 111 and a protrusion 112 extending from a center part of the main body 111, in this embodiment, the protrusion 112 extends along with a position which is parallel to the actuator coil 120. Concretely, the main body 111 and the protrusion 112 are integrated together to form a one-piece structure. In a preferred embodiment, the main body 111 of the external magnet 110 is arch-shaped and the whole external magnet 110 is a symmetrical structure. The external magnet 110 has a magnetic north pole 110a, a magnetic south pole 110b and a transition surface 110c therebetween. In this embodiment, the center line of the external magnet 110 matches with the transition surface 110c which divides the external magnet 110 to be two polar.

As shown in FIG. 3a, the protrusion 112 has a first edge 112a located at the magnetic north pole 110a of the external magnet 110, a second edge 112b located at the magnetic south pole 110b of the external magnet 110 and a top edge 112c connected with the first and second edges 112a, 112b. In a preferred embodiment, both of the first edge 112a and second edge 112b are parallel to the transition surface 110c while the top edge 112e is perpendicular to the transition surface 110c. It should be noted that the protrusion 112 and the whole external magnet 110 are not limited to above shape and structure, other designs which can provide the same function also can be adopted.

Figure 3B:
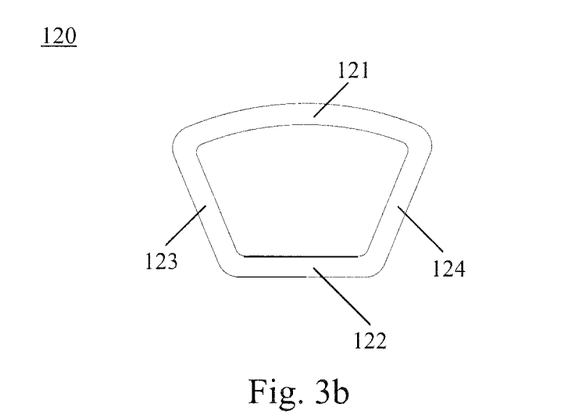
FIG. 3b is a top plan view of an actuator coil of the voice coil motor shown in FIG. 2.

As shown in FIG. 3b, in this embodiment, the actuator coil 120 has a top arm 121, a bottom arm 122, a first side arm 123 and a second side arm 124, both of the first side arm 123 and second side arm 124 connecting with the top arm 121 and bottom arm 122. Preferably, the actuator coil 120 is made of the wires circumvoluted to be a fan-shaped. Understandably, the actuator coil 120 is not limited to fan-shaped, other regular-shaped coils, e.g. a round-shaped coil and even irregular-shaped coils also can be adapted for the present invention.

Figure 4:
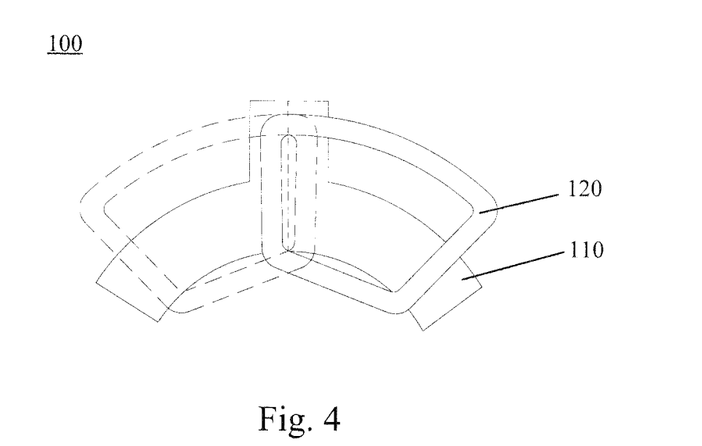
FIG. 4 is schematic diagram showing the moving track of the actuator coil shown in FIG. 3b.
Figure 5:
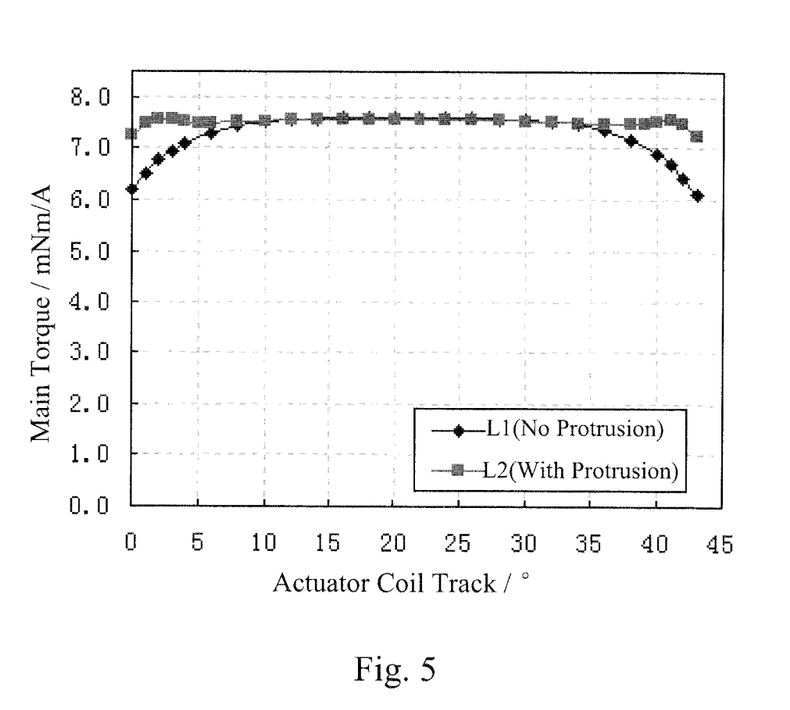
FIG. 5 is a graph showing the torque linearity contrast between the voice coil motor shown in FIG. 2 and the conventional voice coil motor shown in FIG. 1.

As described above, the actuator coil 120 is located above the external magnet 110 and it can move between the two ends of the external magnet 110, shown in FIG. 4. Concretely, when the disk drive unit at working state, the actuator coil 120 can move from a right limited position shown in FIG. 6 to a left limited position shown in FIG. 8, thereby the slider mounted on the head gimbal assembly can be controlled by the voice coil motor 100 to move above the disk from its inner diameter (ID) to its outer diameter (OD). As shown in FIG. 5, such a track of the actuator coil 120 is defined as a moving range from 0 degree to 45 degree. It can be seen from FIG. 5, in such a moving range of the actuator coil 120, the main torque graph L2 produced by the voice coil motor 100 is almost a straight line, whereas the main torque graph L1 produced by the conventional voice coil motor 800 shown in FIG. 1 is visibly declining at two ends. Thus, the main torque graph L2 of the voice coil motor 100 with protrusion 112 has a better linearity than that of the conventional voice coil motor 800 without protrusion.

Figure 6:
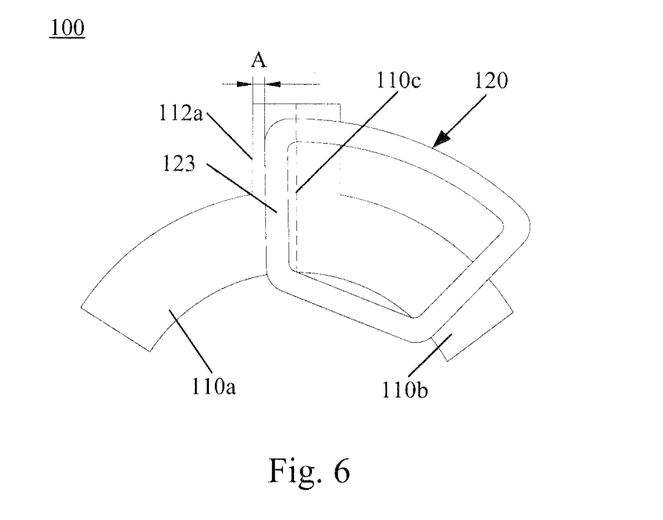
FIG. 6 is a schematic diagram showing a right limited position of the actuator coil shown in FIG. 3b.
Figure 7:
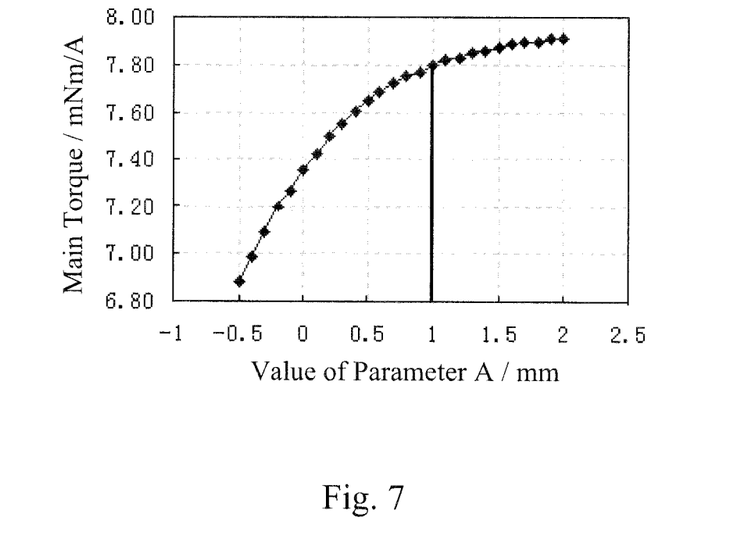
FIG. 7 is a graph showing the main torque varying with the parameter A.

FIG. 6 is a schematic diagram showing a right limited position of the actuator coil 120. As shown in FIG. 6, when the actuator coil 120 arrives at the right limited position where the first side arm 123 of the actuator coil 120 is most close to the transition surface 110c of the external magnet 110, the first side arm 123 is almost parallel to the transition surface 110c and almost the entire actuator coil 120 faces to the magnetic south pole 110b of the external magnet 100 beside the first side arm 123. When the actuator coil 120 is located at above right limited position, there exists a distance between the first edge 112a of the protrusion 112 and the first side arm 123 of the actuator coil 120, and such a distance is called parameter A in this embodiment. Now referring to FIG. 7, which shows a graph of the main torque varying with the parameter A. It can be seen from FIG. 7, when the parameter A increases to 1 mm, the value of main torque is about 7.8 mNm/A which matches with most of torque values shown in FIG. 5 (the middle part corresponding to the coil track changed from 10 degree to 35 degree), thus, it can be concluded that, when the parameter A is less than 1 mm, it is of benefit to improve the linearity at one end of the main torque graph.

Figure 8:
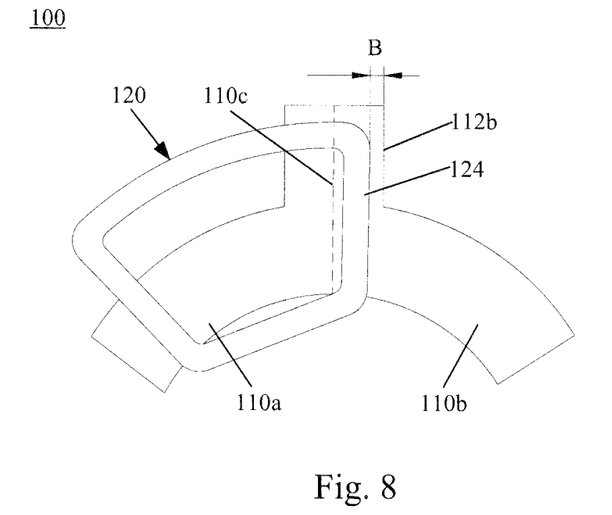
FIG. 8 is a schematic diagram showing a left limited position of the actuator coil shown in FIG. 3b.
Figure 9:
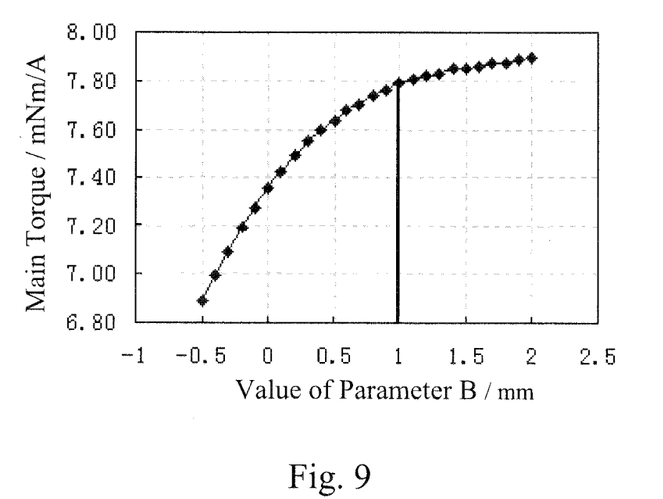
FIG. 9 is a graph showing the main torque varying with the parameter B.

FIG. 8 is a schematic diagram showing a left limited position of the actuator coil 120. As shown in FIG. 8, when the actuator coil 120 arrives at the left limited position where the second side arm 124 of the actuator coil 120 is most close to the transition surface 110c of the external magnet 110, the second side arm 124 is almost parallel to the transition surface 110c and almost the entire actuator coil 120 faces to the magnetic north pole 110a of the external magnet 110 beside the second side arm 124. When the actuator coil 120 is located at above left limited position, there exists a distance between the second edge 112b of the protrusion 112 and the second side arm 124 of the actuator coil 120, and such a distance is called parameter B in this embodiment. Now referring to FIG. 9, which shows a graph of the main torque varying with the parameter B. It can be seen from FIG. 9, when the parameter B increases to 1 mm, the value of main torque is about 7.8 mNm/A which matches with most of torque values shown in FIG. 5 (the middle part corresponding to the coil track changed from 10 degree to 35 degree), thus, it can be concluded that, when the parameter B is less than 1 mm, it is of benefit to improve the linearity at the other end of the main torque graph.

Figure 10:
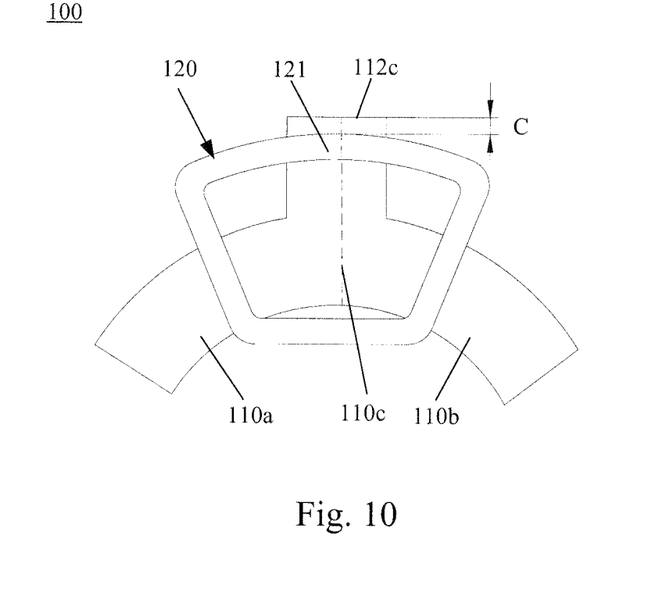
FIG. 10 is a schematic diagram showing a neutral position of the actuator coil shown in FIG. 3b.
Figure 11:
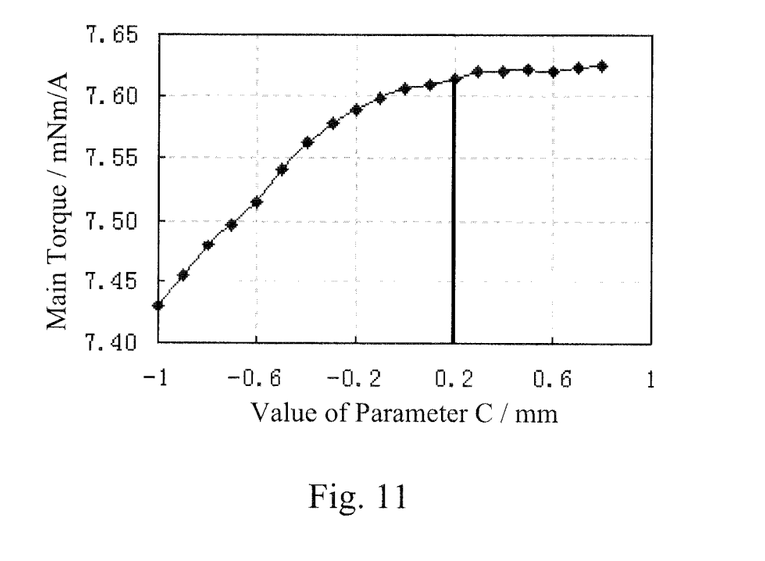
FIG. 11 is a graph showing the main torque varying with the parameter C.

FIG. 10 is a schematic diagram showing a neutral position of the actuator coil 120. As shown in FIG. 10, when the actuator coil 120 arrives at the neutral position, the center of the actuator coil 120 matches with the center of the external magnet 110, thereby half of the actuator coil 120 faces to the magnetic north pole 110a of the external magnet 110 and the other half faces to the magnetic south pole 110b of the external magnet 110. When the actuator coil 120 is located at above neutral position, there exists a distance between the top edge 112c of the protrusion 112 and the top arm 121 of the actuator coil 120, and such a distance is called parameter C in this embodiment. Now referring to FIG. 11, which shows a graph of the main torque varying with the parameter C. According to the same principle described above, it can be concluded that, when the parameter B is less than 0.2 mm, it is of benefit to improve the linearity of the main torque graph.

Above conclusions about the parameters A, B and C are determined without consideration of tolerance, now, we suppose that the magnet profile tolerance is 0.3 mm, thus, the final conclusions can be determined as follows: the value of parameter A is preferably less than 1.3 mm; the value of parameter B is preferably less than 1.3 mm; the value of parameter C is preferably less than 0.5 mm. Based on such structure, the voice coil motor 100 of the present invention can achieve a better linearity of the torque force, which is of benefit to improve the reading and writing performance of the disk drive unit.

Figure 12:
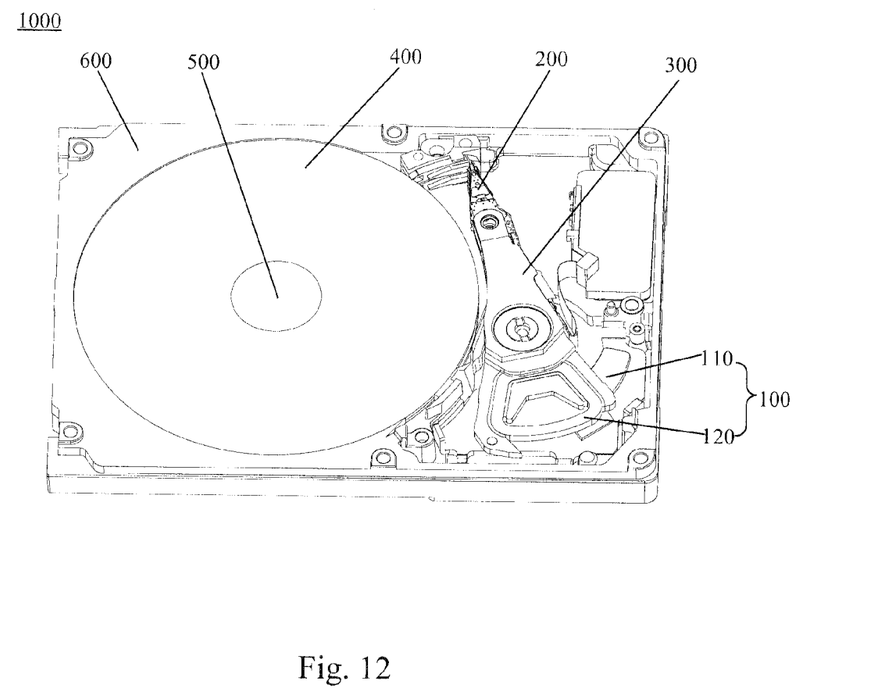
FIG. 12 is a perspective view of a disk drive unit according to an embodiment of the invention.

FIG. 12 is a disk drive unit 1000 according to an embodiment of the invention. The disk drive unit 1000 includes a head gimbal assembly (HGA) 200 having a slider mounted thereon for reading/writing data, a drive arm 300 connected to the HGA 200, a series of rotatable disks 400, a spindle motor 500 to spin the disk 400, and a voice coil motor 100 connected to the HGA 200, all of which are mounted in a housing 600. Because the structure and/or assembly process of disk drive unit of the present invention are well known to persons ordinarily skilled in the art, a detailed description of such structure and assembly is omitted herefrom.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A voice coil motor for a disk drive unit, comprising:
an external magnet having a main body with a magnetic north pole, a magnetic south pole and a transition surface therebetween; and
an actuator coil movably located above the external magnet;
wherein the main body further has a protrusion extending from an outer peripheral edge of a center part thereof for increasing torque force of the transition surface, the outer peripheral edge and an inner peripheral edge which are arch-shaped and smooth along all areas remote from the center part, and a width between the outer peripheral edge and the inner peripheral edge that is constant along all areas remote from the protrusion.

2. The voice coil motor as claimed in claim 1, wherein the protrusion extends along with a position which is parallel to the actuator coil.

3. The voice coil motor as claimed in claim 1, wherein the protrusion has a first edge located at the magnetic north pole of the external magnet, a second edge located at the magnetic south pole of the external magnet and a top edge connected with the first and second edges.

4. The voice coil motor as claimed in claim 3, wherein both of the first and second edges are parallel to the transition surface and the top edge is perpendicular to the transition surface.

5. The voice coil motor as claimed in claim 3, wherein the actuator coil has a top arm, a bottom arm, a first side arm and a second side arm, both of the first and second side arms connecting with the top and bottom arms.

6. The voice coil motor as claimed in claim 5, wherein a distance between the first edge of the protrusion and the first side arm of the actuator coil is less than 1.3 mm, when the actuator coil moves to a position where the first side arm is most close to the transition surface.

7. The voice coil motor as claimed in claim 5, wherein a distance between the second edge of the protrusion and the second side arm of the actuator coil is less than 1.3 mm, when the actuator coil moves to a position where the second side arm is most close to the transition surface.

8. The voice coil motor as claimed in claim 5, wherein a distance between the top edge of the protrusion and the top arm of the actuator coil is less than 0.5 mm, when the actuator coil moves to a position where the center of the actuator coil matches with the center of the external magnet.

9. The voice coil motor as claimed in claim 1, wherein the external magnet has a symmetrical structure.

10. The voice coil motor as claimed in claim 1, wherein the actuator coil is fan-shaped.

11. A disk drive unit, comprising:
a head gimbal assembly including a slider mounted thereon;
a drive arm connected to the head gimbal assembly;
a disk;
a spindle motor operable to spin the disk; and a voice coil motor connected to the drive arm, the voice coil motor comprising:
an external magnet having a main body with a magnetic north pole, a magnetic south pole and a transition surface therebetween; and
an actuator coil movably located above the external magnet;
wherein the main body further has a protrusion extending from an outer peripheral edge of a center part thereof for increasing torque force of the transition surface, the outer peripheral edge and an inner peripheral edge which are arch-shaped and smooth along all areas remote from the center part, and a width between the outer peripheral edge and the inner peripheral edge that is constant along all areas remote from the protrusion.

12. The voice coil motor as claimed in claim 11, wherein the protrusion extends along with a position which is parallel to the actuator coil.

13. The disk drive unit as claimed in claim 11, wherein the protrusion has a first edge located at the magnetic north pole of the external magnet, a second edge located at the magnetic south pole of the external magnet and a top edge connected with the first and second edges.

14. The disk drive unit as claimed in claim 13, wherein both of the first and second edges are parallel to the transition surface and the top edge is perpendicular to the transition surface.

15. The disk drive unit as claimed in claim 13, wherein the actuator coil has a top arm, a bottom arm, a first side arm and a second side arm, both of the first and second side arms connecting with the top and bottom arms.

16. The disk drive unit as claimed in claim 15, wherein a distance between the first edge of the protrusion and the first side arm of the actuator coil is less than 1.3 mm, when the actuator coil moves to a position where the first side arm is most close to the transition surface.

17. The disk drive unit as claimed in claim 15, wherein a distance between the second edge of the protrusion and the second side arm of the actuator coil is less than 1.3 mm, when the actuator coil moves to a position where the second side arm is most close to the transition surface.

18. The disk drive unit as claimed in claim 15, wherein a distance between the top edge of the protrusion and the top arm of the actuator coil is less than 0.5 mm, when the actuator coil moves to a position where the center of the actuator coil matches with the center of the external magnet.

19. The disk drive unit as claimed in claim 11, wherein the external magnet is a symmetrical structure.

20. The disk drive unit as claimed in claim 11, wherein the actuator coil is fan-shaped.

* * * * *